BEST AVAILABLE COPY

United States Statutory Invention Registration [19]

[11] Reg. Number: H410

Berry et al. [43] Published: Jan. 5, 1988

[54] OPEN-CYCLE MAGNETOHYDRODYNAMIC POWER PLANT BASED UPON DIRECT-CONTACT CLOSED-LOOP HIGH-TEMPERATURE HEAT EXCHANGER

[75] Inventors: Gregory F. Berry, Naperville; Vladimir Minkov, Skokie; Michael Petrick, Joliet, all of Ill.

[73] Assignee: The United States of America as represented by the United States Department of Energy, Washington, D.C.

[21] Appl. No.: 317,701

[22] Filed: Nov. 2, 1981

[51] Int. Cl.[4] ..... H02K 44/00

[52] U.S. Cl. ..... 310/11

[58] Field of Search ..... 310/11

[56] References Cited

U.S. PATENT DOCUMENTS

| | | | |
|---|---|---|---|
| 3,439,194 | 4/1969 | Hodge | 310/11 |
| 3,439,195 | 4/1969 | Rummel | 310/11 |
| 3,467,842 | 9/1969 | Carrasse | 310/11 |
| 3,895,243 | 7/1975 | Amend et al. | 310/11 |
| 4,107,557 | 8/1978 | Shepherd | 310/11 |
| 4,200,815 | 4/1980 | Petrick et al. | 310/11 |
| 4,346,316 | 8/1982 | Wysk et al. | 310/11 |

*Primary Examiner*—Stephen C. Buczinski
*Assistant Examiner*—Linda J. Wallace
*Attorney, Agent, or Firm*—William Lohff; James W. Weinberger; Judson R. Hightower

[57] ABSTRACT

A magnetohydrodynamic (MHD) power generating system in which ionized combustion gases with slag and seed are discharged from an MHD combustor and pressurized high temperature inlet air is introduced into the combustor for supporting fuel combustion at high temperatures necessary to ionize the combustion gases, and including a heat exchanger in the form of a continuous loop with a circulating heat transfer liquid such as copper oxide. The heat exchanger has an upper horizontal channel for providing direct contact between the heat transfer liquid and the combustion gases to cool the gases and condense the slag which thereupon floats on the heat transfer liquid and can be removed from the channel, and a lower horizontal channel for providing direct contact between the heat transfer liquid and pressurized air for preheating the inlet air. The system further includes a seed separator downstream of the heat exchanger.

13 Claims, 8 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPEN-CYCLE MAGNETOHYDRODYNAMIC POWER PLANT BASED UPON DIRECT-CONTACT CLOSED-LOOP HIGH-TEMPERATURE HEAT EXCHANGER

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

The open-cycle magnetohydrodynamic (MHD) system of generating electrical power has been widely discussed as a possible means of improving fuel energy utilization. In the MHD system, a fuel such as coal is burned in a combustor to provide combustion gases at such high temperature (2500°-2750° C.) that a plasma is generated. The plasma is seeded with an electrically-conductive material, such as a potassium compound like potassium carbonate ($K_2CO_3$) to increase electrical conductivity of the gases. This high-temperature, electrically-conductive plasma at pressures of approximately 4–9 atmospheres is accelerated then to a high linear velocity (0.7–0.9 Mach, for example) for passing through an open ended circumferentially walled MHD channel. Superconductive magnets outside of the channel direct high levels of magnetic flux crosswise through and along the channel. The electrically-conductive gases rapidly traverse the magnetic flux and thereby induce on the channel walls parallel to the flux a DC potential that is directly proportional to the conductivity and speed of the gases and to the square of the magnetic flux, and that is inversely proportional to the pressure of the gases. This DC power in turn is converted to AC power by an inverter or the like for normal transmission to end users.

The combustion gases discharged from the MHD channel will be at temperatures generally exceeding 2000° C. and probably even as high as 2200° C., and at velocities generally exceeding 0.5–0.8 Mach. A diffuser is used to convert the kinetic energy into thermal energy by recovering the pressure to atmospheric or slightly higher.

Known MHD systems then direct the hot combustion gases through high temperature radiant boilers that cool the gases somewhat by generating steam. The boiler is sized to allow the combustion gases to linger therein a short duration while remaining at a high temperature. By maintaining the combustion gases hotter than 1500° C. for 1.5–2.0 seconds, the nitrogen impurities ($NO_X$) can be decomposed to be within acceptable EPA limits. Some slag and other undesirable waste combustion components are separated out of the combustion gases as condensate on the boiler walls and can be discharged at the bottom of the boiler. The fuel-rich combustion gases from the radiant boiler are directed through a secondary combustor wherein additional air is added (stiochiometry is increased from 0.75 to 1.05 approximately) to complete the fuel combustion but at relatively low temperatures. The combustion gases are then directed through the bottoming cycle equipment that generates additional steam usable in conventional steam expansion devices, such as a steam turbine. The combustion gases then would typically be passed successively through an economizer and a low temperature air heater, wherein water and air respectively would be heated for later use somewhere in the system, while the combustion gases would be cooled to 150°-200° C. The cooled combustion gases then would be passed through the gas cleaners whereat residual seed, slag or other impurities would be separated out. Inasmuch as the seed (typically $K_2CO_3$) is a very high cost item and is used in large quantities approaching even 15–25% of the quantity of coal burned, every effort is made to recover and reprocess the seed for subsequent reuse. The combustion gases are subsequently discharged via a conventional stack to the atmosphere.

To support coal combustion at the elevated temperature of 2500°-2750° C., the combustion must be with oxygen enrichment or with high temperature air. Oxygen enrichment would require additional components, viz., an oxygen generation facility, and energy inputs to operate the facility; thus both increasing the cost and reducing the overall efficiency significantly. It is possible to provide atmospheric air with sufficient temperature and/or pressure energy levels to produce the high combustion temperatures, but special air preheaters are needed. The existing technology provides at least two high-temperature air preheaters, each comprised of a chamber housing a matrix network of refractory material blocks, such as ceramic. The combustion gases are passed through one preheater to heat the blocks therein while atmospheric air pressurized by conventional compressors simultaneously is passed through the other preheater and takes heat from the already heated blocks therein. The pressurized air passing through these air preheaters is preferably at pressures of approximately four to nine atmospheres while the combustion gases are at approximately one atmosphere so that pressure confinement means has to be provided. Moreover, the gating mechanisms that alternately pass the combustion gases and the pressurized air, respectively, at large temperature and pressure differences, through the air preheaters are complicated and introduces specific and costly design problems. Frequent thermal cycling at these elevated temperatures moreover, is hard on the refractory material to the extent that the risk of shortened operating life is present. Of concern also is the fact that the high temperatures and generally fuel-rich conditions of the combustion gases greatly accelerate corrosion of the components, as well as slag and particulate build-up on the component walls.

SUMMARY OF THE INVENTION

This invention relates to an improved open-cycle MHD power generating system that eliminates some of the components previously used in MHD systems, thereby reducing the complexity, cost and construction requirements of the system, while yet having greater overall operating reliability and fuel utilization efficiency.

The invention specifically provides an improved opencycle MHD system that (1) controllably cools the combustion gases discharged from the MHD diffuser in such a manner that much of the slag and seed is separately removed and much of the nitrogen impurities ($NO_X$) are lowered to acceptable levels; and further that (2) generates abundant quantities of high-temperature preheated air for supporting high-temperature fuel combustion. Thus only relatively clean combustion gases are passed on to conventional bottoming cycle equipment. Moreover the heretofore proposed radiant boiler, cycled banks of air preheaters, and/or even oxygen enrichment equipment need not be provided and can be eliminated.

The invention utilizes an improved heat exchanger that is in the form of a continuous loop within which is circulated a heat transfer substance in the liquid or molten phase at temperatures between approximately 1300° and 1750° C. The loop has two separate and distinct horizontally disposed channels interconnected at their ends by separate and distinct vertically disposed columns. The heat transfer liquid thereby is under different pressures, as determined by the column head, in the upper and the lower channels. There further is provided (1) inlet means for admitting to the upper low-pressure channel the hot combustion gases as discharged directly from the MHD diffuser; (2) routing means in the low-pressure channel for directly exposing or intermixing the combustion gases with the heat transfer liquid therein; and (3) outlet means from the low-pressure channel for discharging the combustion gases from the loop. These would also be (1) inlet means for admitting air to the lower high-pressure channel; (2) routing means in the high-pressure channel for directly exposing or intermixing the air with the heat transfer liquid therein; and (3) outlet means from the high-pressure channel for discharging the air from the loop. Means to circulate the heat transfer liquid in a unidirectional manner about the closed loop is an essential feature of the device.

The hot combustion gases from the MHD diffuser as directly exposed to or intermixed with the heat exchanger liquid, thereupon are cooled by the heat transfer liquid which then can effectively be used to heat the pressurized air for the fuel combustion. The combustion gases thereby are controllably cooled from 2000°-2200° C. to approximately 1300°-1600° C. and the pressurized air is controllably heated to temperatures in excess of 1300°-1500° C. The high temperature, pressurized air could then be routed by appropriate means into the combustor to support fuel combustion therein at the high temperatures of 2500°-2750° C. or higher, whereby oxygen enrichment of the combustor and/or the need for any oxygen generation facility can be virtually eliminated; as well as all ceramic air preheaters.

This invention further provides for means that allows for the direct removal of slag and seed prior to passing through the conventional bottoming cycle components, such as the steam boilers or normal steam generating facilities, air cleaners and air preheaters. This means more efficient and reliable operation of these components is possible, which can also be reflected by smaller overall installation cost. The clean combustion gases further allow for reduced maintenance expenses of such components. To accommodate slag removal the heat exchanger loop would preferably have the heat transfer liquid therein at a controlled temperature generally less than the condensation temperature of the slag in the combustion gases. Consequently, the slag would condense in the heat transfer liquid. Because the slag would be less dense than the heat transfer liquid, it would float to the top of the liquid in the channel, and it could be continuously drawn off through appropriate weir-type takeoff ports. It is possible that some of the condensing slag and/or seed could dissolve in the liquid coolant and be carried around therewith, but this should have little if any reduction in the overall effectiveness of the heat transfer.

The invention further provides improved means for extracting from the combustion gases the electroconductive seed materials added to the plasma in the combustor. The seed potassium carbonate ($K_2CO_3$) would react with the sulfur dioxide gases ($SO_2$) generated during combustion to produce potassium sulfate ($K_2SO_4$). The improved seed separator constitutes a bath of liquid, such as copper having a high boiling temperature and low melting temperature (approximately 2300° and 1075° C.) The temperature of the bath is kept at (1100° C.) approximately the condensation temperature of the potassium sulfate ($K_2SO_4$) and the exhaust gases are passed or bubbled through the liquid bath which effectively equalizes the temperatures of the gases and the bath. The potassium sulfate condensate has a substantially lighter density than that of the liquid bath so that flotation separation is possible. The liquid bath can be continuously maintained at the condensate temperature by monitored blending in proportioned amounts of (1) the hot combustion gases, and (2) combustion gases that have already been cooled by having been passed through the bottoming cycle components. This can be done by locating a gas mixer upstream from the seed separator and passing all of the combustion gases through the gas mixer and a proportioned amount of the cooled gases from the bottoming cycle components. An alternative to this would be to cool the liquid bath by secondary heat transfer with a bottoming cycle heat transfer medium, such as with steam or with low temperature air. This would thereby eliminate the gas mixer; but the temperature control feedback for the separator bath liquid would control the cooling rate of the secondary heat transfer medium.

This invention further relates to a means for removing nitrogen impurities ($NO_X$) from the combustion gases, so that all related EPA pollution requirements of the system are met and exceeded. This is possible again because the hot combustion gases are kept within the heat exchanger channel for an extended duration and at controlled and elevated temperatures to allow the $NO_X$ gases therein to be decomposed or reduced sufficiently to be within the EPA standards.

DETAILED DESCRIPTION OF THE INVENTION

Figure 1:
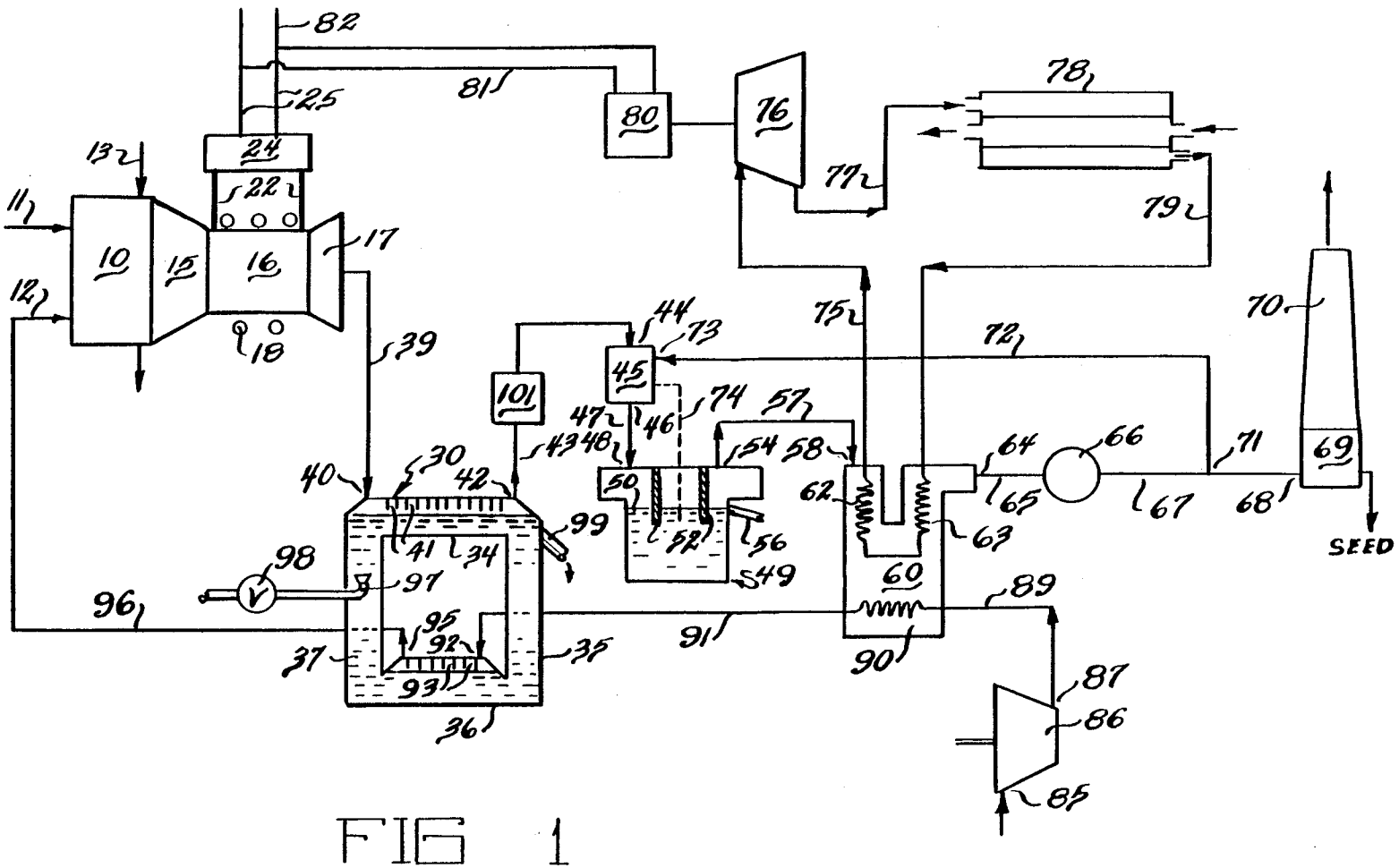
FIG. 1 is a schematic illustration of the open cycle MHD power plant system disclosed herein.

Referring now to FIG. 1 of the drawing, a schematic flow circuit is shown of the improved MHD power generating system. The system has a combustor 10 with a fuel inlet 11, typically for pulverized coal; an air inlet 12, typically for air at temperatures in excess of 1200°-1300° C. and at 4-9 atmospheres of pressure; a seed inlet 13, for the "seed" compound such as potassium carbonate ($K_2CO_3$); and a slag outlet 14. The combustor 10 would comprise a chamber within which the fuel can be burned to produce ionized combustion gases, or plasma, at very high temperatures, viz., (2500°-2750° C.) or higher. The seed when ionized at these temperatures in the combustion gases improves the electrical conductivity of the gases. Converging nozzle section 15 accelerates the combustion gases discharged from the combustor at perhaps 6 atmospheres of pressure to velocities between Mach 0.7-0.9 for passage through an open ended, circumferentially walled MHD channel 16. A diffuser 17 located immediately downstream of the MHD channel, reconverts the kinetic energy of the combustion gases at perhaps 0.8 atmospheres of pressure back to approximately 1.0-1.1 atmospheres of pressure. The gases are yet however at almost 2000°-2200° C.

Superconducting magnets 18 are located outside of the MHD channel 16 effective to direct an intense magnetic field crosswise through and along the channel 16. A direct current potential (EMF) is generated on the channel walls that lie parallel to the field. The EMF is directed by appropriate conductors 22 to an inverter 24, which converts it to highvoltage, alternating-current power at conductors 25.

A high-temperature, liquid-gas heat exchanger 30 (see FIG. 2) is located immediately downstream of the diffuser 17. The heat exchanger 30 is in the form of a continuous loop having a pair of separated channels 34 and 36 interconnected at their opposite ends by a pair of separated vertical columns 35 and 37. A heat transfer medium or liquid L is circulated around the loop. The outflowing hot combustion gases A from the diffuser 17 are directed by line 39 and inlet 40 into the channel 34, flow through the channel, and are discharged via outlet 42 from the channel. This provides for direct contacting or mixing of the heat transfer liquid L and the gases A. Baffles 41 are illustrated in the channel 34 to induce more effective intermixing and heat transfer between the liquid and gases, but other means such as bubbling the gases through the liquid can be used also for this purpose. In a preferred embodiment, the medium L would be copper oxide ($Cu_2O$) having a boiling temperaure of approximately 1800° C. and a melting temperature lower than 1300° C., so that it would be molten or liquid in this temperature range.

Figure 3:
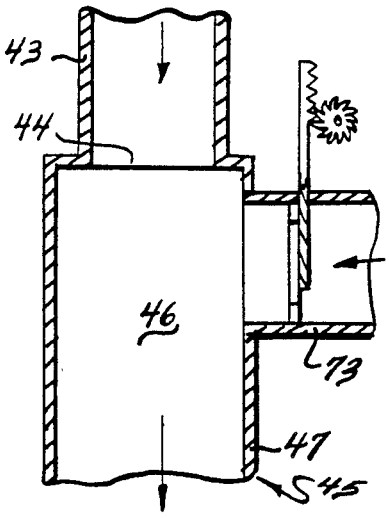
FIG. 3 is a schematic illustration of a gas proportioner used in the MHD system of FIG. 1.
Figure 4:
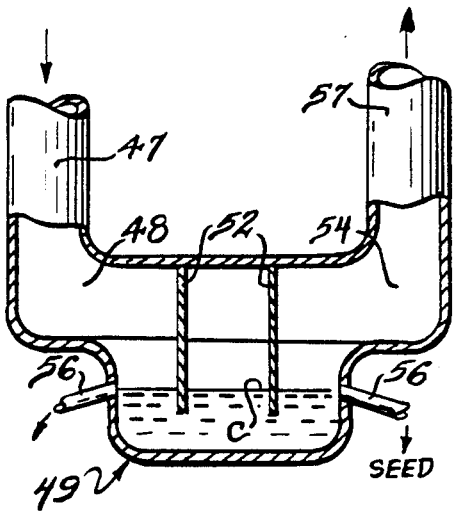
FIG. 4 is a schematic illustration of one embodiment of a seed separator used in the MHD system of FIG. 1.

The combustion gases A discharged from the loop channel 34 through outlet 42 (see FIG. 1) are then directed via conduit 43 and inlet 44 into a gas proportioner 45 (see FIG. 3). The gas proportioner 45 has a through passage that allows all of the combustion gases to pass for discharge from outlet 46 and flow via line 47 and inlet 48 to seed separator 49 (see FIG. 4). The seed separator 49 includes a large vessel filled with a bath of liquid coolant C. Baffles 52 or other means can be used to direct the combustion gases A from the inlet 48 in direct contact through liquid bath to the outlet 54. Seed condensed in the liquid generally will be of lesser density than the liquid itself and thereby can be separated out by flotation through weir ports 56 and recovered. The preferred liquid coolant C could be copper (Cu) having a boiling temperature in excess of 2300° C. and melting temperature of less than 1100° C.

The combustion gases are then directed from the seed separator 49 via outlet 54 and line 57 to inlet 58 of a conventional steam generating boiler 60. The combustion gases move through the boiler, over steam generating components 62 and 63, and via outlet 64 and line 65 to a blower 66. The blower 66 draws the combustion gases from the boiler and forces them via line 67 and inlet 68 through gas cleaner 69. The cleaner 69 removes various impurities yet remaining in the gases, including possibly some recoverable seed material, before the gases are discharged out stack 70 to the atmosphere. This boiler 60 and cleaner 69 would be part of conventional bottoming cycle apparatus normally associated with a coal-fired steam power plant.

Located between boiler outlet 64 and gas cleaner inlet 68, as illustrated in line 67, is a take-off tee 71 that is used to divert part of the cooled combustion gases via line 72 back to inlet 73 of the gas proportioner 45 (see FIG. 3). As noted, the gas proportioner 45 passes all of the combustion gases received from the heat exchanger 30 (at inlet 44) on to the seed separator 49 (at inlet 48); and also has an adjustable restriction at inlet 73 that proportions out and passes through sufficient quantities of recycled combustion gases (cooled in boiler 60 and diverted by tee 71 at inlet 73) in order to obtain certain temperatures of the combined gases and/or liquid temperatures in the separator 49.

By maintaining the separator liquid generally below the condensation temperature of the seed material in the combustion gases, the seed material as condensed can be separated from the liquid. Typically the seed material would be potassium sulfate ($K_2SO_4$) obtained by the reaction of the initial "seed" potassium carbonate ($K_2CO_3$) and a product of combustion sulfur dioxide ($SO_2$), so that the liquid bath should be maintained in a temperature range of 1000°-1150° C., somewhat below the condensation temperature of the seed material. A temperature feedback control 74 sensing the temperature of the separator liquid can be used to open or close the restriction in the gas proportioner 45 so as to divert more or less of the cooled gases into the separator 49 and thereby maintain the separator liquid at the temperatures desired. Because the condensate is of lesser density than the liquid itself (having a specific gravity of approximately 2 versus 8), it can be separated out by flotation and drawn off through weir ports 56 and recovered. However, if the specific gravities of the condensate and bath liquid are approximately equal, chemical means can be used for separation. Another candidate bath liquid would be potassium chloride (KC1) having a melting temperature of 770° C.

The output from the steam generating components 62 and 63 is directed as steam via line 75 to turbine 76, as steam from the turbine via line 77 to condenser 78, and as water via line 79 back to the boiler. The turbine 76 drives generator 80 which produces electrical power than can be directed via conductors 81 and is cumulative to the electrical power generated by the MHD channel 16 as at conductors 25. The total MHD output power, as at conductors 82, thereby includes the MHD channel generated electrical power and bottoming cycle equipment generated power.

A compressor 86, driven by the turbine 76 or other means, takes atmospheric air at inlet 85 and compresses it to the order of 4-9 atmospheres. This pressurized air is directed from the compressor outlet 87 via line 89 to heat exchanger coil 90 in the boiler for initial preheating, and then via line 91 and identified as gas B to inlet 92 of channel 36 (see FIG. 2) of the loop heat exchanger 30 for passage through the channel to the outlet 95. Baffles 93 in the channel 36 provide for direct contacting or mixing of the heat transfer liquid L and the pressurized air or gas B. The pressurized air B is then discharged from the loop channel 36 through outlet 95 and is directed via line 96 and inlet 12 into the combustor.

Figure 2:
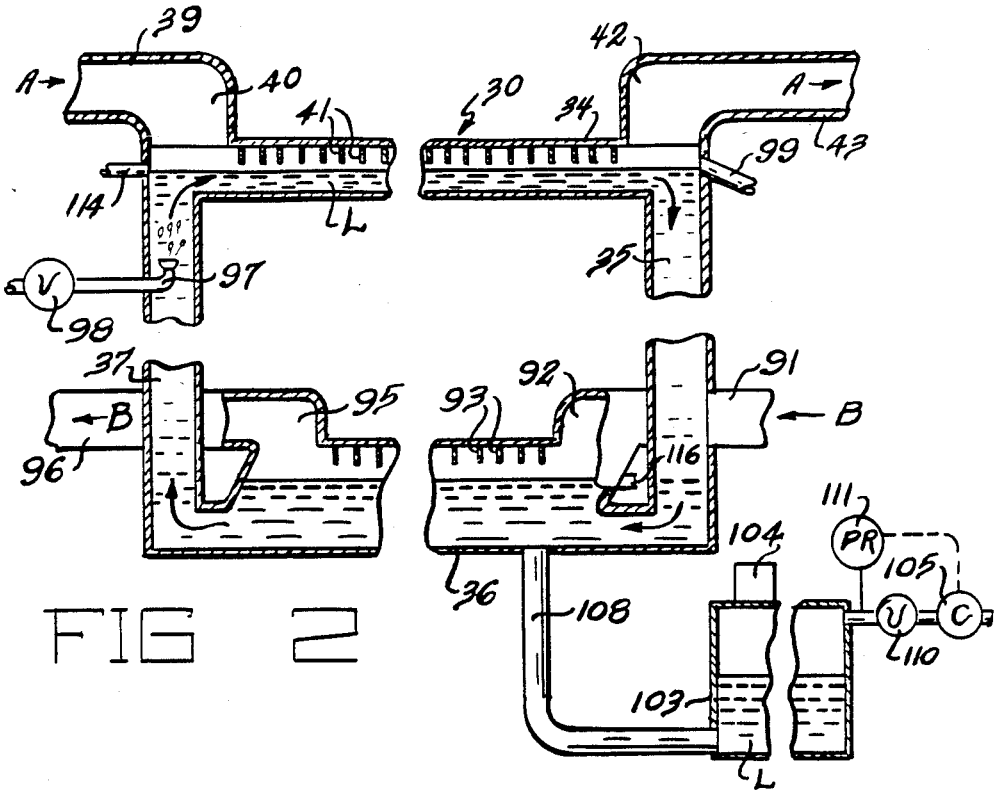
FIGS. 2 and 2A are a schematic illustration of one embodiment of a high-temperature, liquid-gas heat exchanger used in the MHD system of FIG. 1.

Means are provided to unidirectionally circulate the heat transfer liquid L about the closed heat exchanger loop. As illustrated in FIGS. 1 and 2, a gas injector 97 is located in loop column 37 and has upward open nozzle outlets. A gas, such as air, under pressure is controlled by valve 98 and discharged with vertical upward components from the nozzle outlets to induce accompanying upward movement of the heat transfer liquid. The gas discharge from the injector 97 further resolves into bubbles that rise and create a bubble pump action vertically in the column 37. Moreover, the bubbled heat transfer liquid in column 37 is less dense than the nonbubbled heat transfer liquid in column 35 so that this differential in column mass as seen across the interconnecting channel 36 further contributes to the effective circulation of the heat transfer liquid around the closed loop. This is the principle of natural circulation. The injected gas would be separated out of the heat transfer liquid and be discharged through the outlet 42 from the upper channel 34. The pressure, velocity and mass discharge of the gas from the injector means 97 would be selected sufficient to circulate the heat transfer liquid continuously around the loop, but the energy required to do this would normally be less than 0.1% of the overall energy exchange of the heat exchanger.

The fuel is generally burned in the combustor at a low stoichiometric ratio of 0.7–0.8 (or is fuel-rich as compared to the oxidizer needed for theoretically complete combustion) in order to keep the nitrogen oxide impurities ($NO_x$) low for the desired high temperature combustion (2500°–2750° C. or higher). The combustion gases thus leaving the combustor 10 are rich in unburned fuel. However, inasmuch as the combustion gases A in passing through the heat exchanger channel 34 are maintained hotter than approximately 1500° C. for at least the duration of 1.5–2.0 seconds, the nitrogen oxide impurities ($NO_x$) decompose to be within acceptable EPA limits. Thereafter, the unburned fuel can be burned at a higher stoichiometric ratio of 1.05–1.15, provided the combustion gases do not exceed the critical temperatures of 1500°–1600° C. whereat $NO_x$ impurities reform. Air needed to support this secondary combustion (over and above that air already added to the combustion gases because of the injector means 97) can be added to the combustion gases and this combustible mixture can then be burned in a secondary combustor 101 located immediately downstream of the heat exchanger 30. This is only illustrated schematically in FIG. 1, as such combustors are well known. It is also possible that the secondary combustion could be completed in the channel 34 of the heat exchanger.

Also illustrated in FIG. 2 is a reservoir 103 for the heat transfer liquid L contained in the heat exchanger 30. The reservoir 103 would have sufficient volume to hold all of the heat transfer liquid when the system is not in use. The heat transfer liquid could be brought to or maintained in its molten state by the heat output from a secondary source, such as furnace 104. A compressor 105 is used then to pressurize the reservoir 103 sufficiently for pumping the liquid via the line 108 into the closed loop. A control valve 110 can be operated in connection with a pressure regulator 111 in the reservoir and sensors 114 and 116 in the channels 34 and 36, respectively for maintaining sufficient liquid in the heat exchanger loop to have the liquid at the proper surface heights in the channels.

The heat exchanger 30 illustrated in FIGS. 1 and 2 is of the parallel flow type, where each isolated gas A and B (the combustion gases A in channel 34 and the pressurized air B in channel 36) and the heat transfer liquid L move in the same direction within the respective channel The parallel axial movement of each gas through its respective channel helps circulate the heat transfer liquid unidirectionally around the loop. However, the differential in temperatures between the incoming combustion gases and the exiting pressurized air B will be the largest, as compared to any of several counterflow arrangements that will now be described.

For example, the combustion gases A could be moved through the heat exchanger channel 34 in the same direction (parallel flow) as the heat transfer liquid is moved through channel 34: whereas the pressurized air B could be moved through the channel 36 (merely by reversing the line connections to the inlet and outlet) in the opposite direction (counterflow) as the heat transfer liquid is moved through the channel 36. Alternatively, combustion gases A could be moved axially through channel 34 in counterflow direction to the movement of the heat transfer liquid L through the channel (merely by reversing the line connections to the inlet and outlet), while the pressurized air B could be moved axially through channel 36 in parallel flow compared to the heat transfer liquid movement through the channel.

Still further, both the combustion gases A and the pressurized air B could be moved through their respective channels 34 and 36 in counterflow relation to the flow of the heat transfer liquid L through the channels and around the loop. These variations would provide for more effective heat transfer as between the gases and the heat transfer liquid and/or smaller temperature differences between the incoming combustion gases A and the exiting pressurized air B. However, they also would require a larger output from the ejector means 97 in column 35 in order to circulate the heat transfer liquid L continuously about the loop. Also, a cross flow heat exchanger is possible merely by locating the gas inlet and outlet manifolds along the opposite sides of the channel. The heat transfer liquid flow would be axially through the channel from one column to the other column while the gas flow would be crosswise to this movement from the inlet manifold on one side of the channel to the outlet manifold at the opposite side of the channel.

Figure 2A:
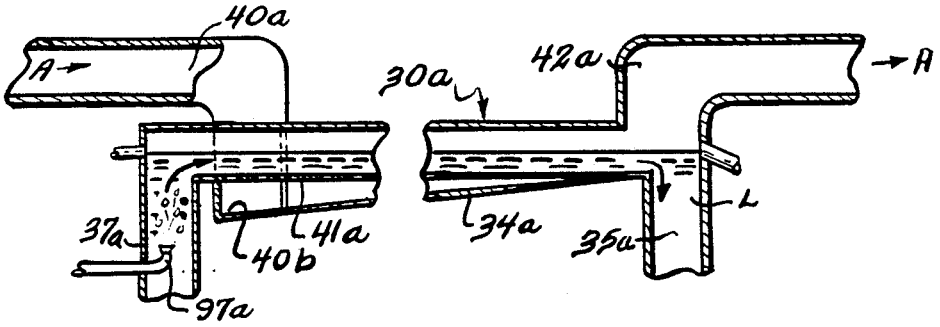

Moreover heat exchanger **30*a* (FIG. 2A) might be modified so that gas inlet manifold 40*a* would extend at 40*b* across the bottom of channel 34*a* under a perforated plate 41*a* and heat transfer liquid L in the channel. Thus, all flow of gas A through the channel would bubble through the liquid in order to reach gas outlet manifold 42*a*, ensuring effective heat transfer between the liquid and the gas. As before, the liquid L would circulate up column 37*a*, across channel 34*a*, and down column 35*a*, caused by ejector means 97*a***.

Various forms of conventional baffles or bubbling means are possible for use in the heat exchanger 30 which would improve heat transfer characteristics as between the heat transfer liquid and the gases moving through the channels. For example, each baffle could have a saw tooth or wavy lower edge, and the separate baffles spaced along the channel can be arranged to stagger the saw teeth relative to one another. The lower baffle edge could be located near the surface of the liquid in the respective channel . . . just slightly above, even with, or perhaps below it . . . but the apex between each two adjacent saw teeth would typically be located above the liquid surface. Most of the gas flow through the channel would be directed by the baffles in a back and forth or cross flow pattern in the space above the liquid surface, directly contacting the liquid and creating turbulence and/or waves along the liquid surface. The pressure differential of the gas across the lower edge of each baffle could bubble the gas through the heat transfer liquid as it passed around that baffle. Any of these techniques would provide additional heat transfer and/or intermixing between the heat transfer liquid and the gas.

The high-temperature liquid-gas heat exchanger 30 is the subject of a separate application for patent filed concurrently herewith. However, the advantageous operating characteristics of the heat exchanger as it applies specifically to the improved MHD system will be noted now.

Inasmuch as the combustion gases and the pressurized air admix with or directly contact the heat transfer liquid in the heat exchanger 30, there is most effective heat transfer between the combustion gases and the liquid, and between the pressurized air and the liquid. By proper design, the difference in temperature between the incoming combustion gases and exiting pressurized air can be made quite small. A major advantage of this interchange is that the pressurized air can be heated to sufficiently high temperatures so that it can be admitted directly to the combustor 10 for supporting the high temperature combustion therein. This eliminates the need for oxygen enrichment to the combustor. Moreover, since the heat transfer liquid is continuously circulated around the loop, the cooling of the combustion gases and in turn the heating of the pressurized air is continuous and not cycled as in prior MHD high temperature regenerative air heater systems.

The direct contacting of the combustion gases A with the heat transfer liquid L provides yet another most useful advantage, which is that impurities yet entrained in the combustion gases can be separated out of the gas as liquid and/or solid particulates. As it happens, slag in the combustion gases has a condensation temperature in the range of 1300°–1500° C. so that by holding the heat transfer liquid L below or near this temperature, the slag liquifies. The slag typically has a specific gravity of approximately 1.5–3.0, versus 6 for heat transfer liquid, so that the slag condensate would float to the surface of the heat transfer liquid and could be separated out by flotation over weir type outlet 99 located in the upper channel. It is possible that some portion of the slag would be dissolved in the heat transfer liquid, but the heat transfer characteristics of the exchanger should not be substantially reduced.

Another most important aspect of the liquid-gas heat exchanger 30 is the pressure differentials of the heat transfer liquid as it is circulated about and through the heat exchanger. By locating each channel 34 and 36 vertically spaced apart, a head pressure differential within the heat transfer liquid is established incrementally in the columns and specifically as between the lower and upper channels. When the heat transfer liquid has a high specific gravity, a significant pressure differential can be established over a relatively small height differential. For example, with a heat transfer liquid like copper oxide ($Cu_2O$) having a specific gravity in excess of 6, if the upper channel 34 were elevated above the lower channel 36 by a distance of approximately 8 meters, the pressure differential as between the lower and upper channels is approximately 5 atmospheres. If the upper channel were at 1 atmosphere of pressure, the lower channel would be at approximately 6 atmospheres of pressure.

Each gas outlet (42 and 95) is located above the surface of the heat transfer liquid in its channel (34 and 36) so that the liquid will not become entrained in the gas discharge from the channel. The pressure of either gas at its respective inlet (40 and 92) is slightly greater than but comparable to the pressures of the heat transfer liquid (at the surface) within that respective channel (34 and 36). The pressure differential of either gas between its inlet and corresponding outlet (40 and 42 for channel 34, and 92 and 95 for channel 36) is expected to be quite small, for example less than 0.1 atmospheres and yet be sufficient to move the gas through the channel. The pressure of the gas at the outlet (42 and 92) will be generally the same as the liquid pressure at the surface for the respective channel (34 and 36).

The movement of the pressurized air and the combustion gases through the respective channels of the heat exchanger can serve also to move the heat transfer liquid through the channel in the parallel flow heat exchanger. This would be possible because the combustion gas and/or pressurized air interchange and admix in direct contact with the heat transfer liquid.

It is further possible to inject the seed into the pressurized heated air line 96 from the heat exchanger 30, which then will be dispersed in the combustor itself. Moreover, if a seed such as potassium hydroxide (KOH) is used having a vaporization temperature of the order of 1050° C. the seed is vaporized in the pressurized air stream for even more effective distribution within the combustor.

It can be noted that one very beneficial feature of this improved operating cycle is that the slag is almost entirely removed from the hot combustion gases prior to the attempted separation of the seed from the combustion gases in the seed separator 49. In this manner, the seed as separated out will be quite free of other impurities so that it can be more easily and economically reprocessed for subsequent reuse.

Figure 7:
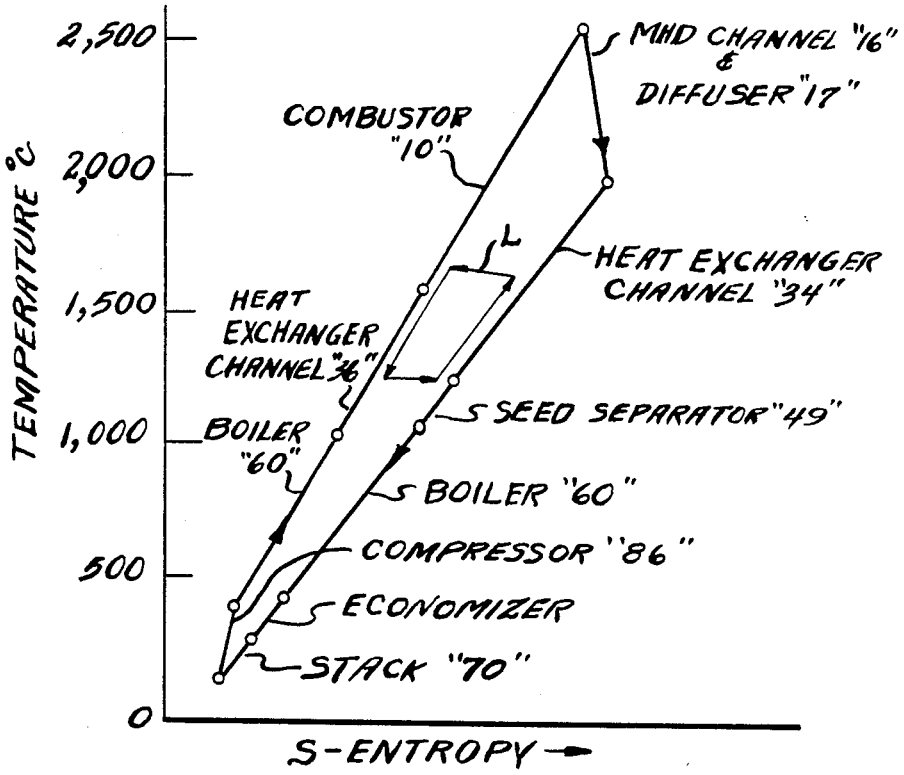
FIG. 7 is a typical thermodynamic cycle curve illustrating the fluid temperatures and temperature-entropy levels encountered in the MHD system of FIG. 1.

A representative temperature entropy curve is illustrated in FIG. 7 covering the MHD cycle of FIG. 1, and various changes as attributed to the separate phases of the cycle will be noted between the dots on the curve. Thus the compressor 86 first pressurizes the inlet air, the air is then successively heated first by the boiler 60 and then in the heat exchanger channel 36. Thereafter, the air is combusted in the combustor 10 and converted to the combustion gases. The combustion gases are cooled slightly in the MHD channel 16 and diffuser 17, are cooled further in the heat exchanger channel 34, seed separator 49, the boiler 60, and finally in the economizer; whereupon the gases are discharged out the stack with the resultant heat loss. The heat transfer liquid in turn is likewise heated in the combustion gases channel 34 and cooled in the pressurized air channel 36.

Figure 5:
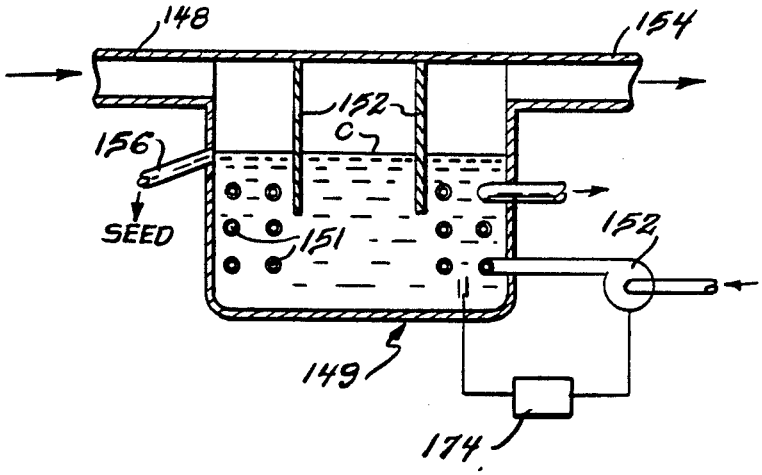
FIG. 5 is a schematic illustration of a second embodiment of a seed separator for use in the MHD system of FIG. 1.

An alternative means for maintaining the seed separator coolant C within a certain temperature range consistent with that for condensing out the seed material in the combustion gases is illustrated in FIG. 5. The seed separator 149 would have conductive tubes 151 submerged below the liquid coolant C and would circulate a cooling fluid such as water or air through the tubes. A variable speed pump 152 can be utilized to modulate the flow of the cooling fluid through the tubes 151 responsive to a temperature feedback control 174 detecting the temperature of the liquid coolant C. Use of this alternate cooling means would of course eliminate the gas proportioner 45 and the flow diverter tee 71 of the FIG. 1 embodiment. The combustion gases would enter the seed separator 149 at inlet 148 (corresponding to inlet 48 in FIG. 1), would be directed by baffles 152 through coolant C, and would be discharged from the outlet 154 (corresponding to outlet 54 in FIG. 1). The condensed seed would be separated out by weir separator 156.

Figure 6:
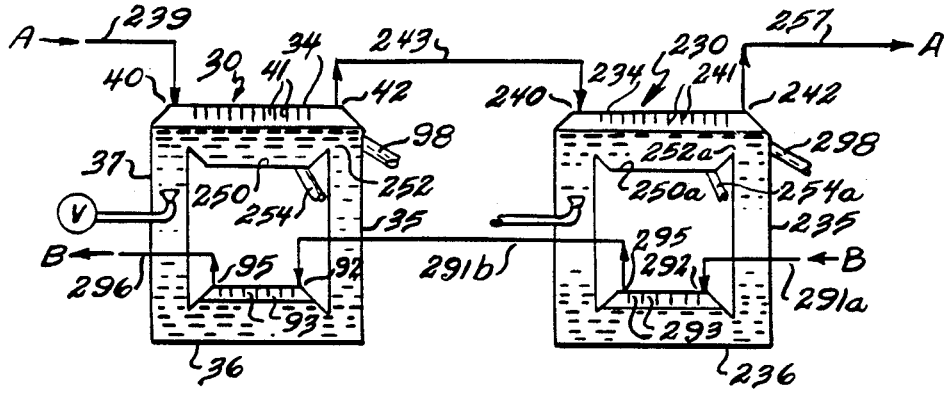
FIG. 6 is a schematic illustration of a second embodiment of a high-temperature, liquid-gas heat exchanger arrangement for use in the MHD system of FIG. 1.

An alternative means for separating out slag, seed, and other impurities from the combustion gases is disclosed in FIG. 6, and includes a second heat exchanger 230, between the heat exchanger 30 and the seed separator 49, to handle flow for both the combustion gases and for the pressurized air. This heat exchanger 230 would be similar to, if not identical to, the heat exchanger 30 (and the components therefore are identified where appropriate with similar numbers having the prefix "2"). Thus each heat exchanger (30 and 230) would have an upper channel (34, 234) with gas inlet (40, 240) and gas outlet (42, 242), and baffles (41, 241); a lower channel (36, 236) with gas inlet (92, 292) and gas outlet (95, 295), and baffles (93, 293); and interconnecting columns (35, 235 and 37, 237). The combustion gases A via line 239 from the diffuser would thus pass first through the upper channel 34 of heat exchanger 30 and then via line 234 to and through upper channel 234 of heat exchanger 230, and via line 257 to the seed separator 49. The pressurized air B in turn carried via line **291*a* from the boiler would pass through the lower channel 236 of heat exchanger 230, via line 291*b* to and through lower channel 36 of heat eschanger 30, and via line 296** to the combustor.

The heat transfer liquid used in heat exchanger 230 could, for example, be potassium hydroxide (KOH) having a boiling temperature of the order of 1320° C., a melting temperature of the order of 360° C., and a specific density of approximately 2. The heat transfer liquid L would operate in the cooler temperature range (between 800° and 1300° C., for example) for the heat exchanger 230 as compared to heat exchanger 30 (1300° C.–1800° C., for example) to condense materials having a lower condensation temperature. The slag seed and other condensate would float to and be collected on the surface of the liquid in the upper channel 234, and be discharged from the heat exchanger via surface separator such as weir type outlet 298.

Also of interest is the possibility of separating out a liquid condensate heavier than the heat transfer liquid L, which is of course, possible, but the take-off weir connection would have to be from the bottom of the channel. In this regard, the channel 34 and 234 in FIG. 6 has an enlarged pocket **250, 250*a* formed below the corner 252, 252*a* of the channel, and a wier outlet 254, 254*a*** connects off the pocket.

The components to be operated at hot temperatures involved in the cycle might be formed with an outer skin of structural material and an inner refractory liner that would insulate the structural skin from the high temperatures. A suitable refractory having a melting temperature in excess of 2000° C. would be alumina ($Al_2O_3$), which further possesses exceptional strength and resistance against abrasion, corrosion or the like. Other refractions might include silicon carbonate (SiC) or boron nitrite (BN), each of which has a melting temperature in excess of 2700° C. It is possible that some dissolving of the refractory could take place over time because of the various moving fluids; however, this would be a consideration in the choice of the materials. Additionally, the structural walls could be formed with coolant tubes or passages formed on them so that the walls might be cooled by a circulating coolant such as a liquid metal, salt, steam or the like. This would help maintain the structural integrity of the walls were they not otherwise cooled. These structural adaptations of having the refractory lined structural wall, the coolant-cooled wall, and/or a combination of these could be used for the baffles as well.

By way of example, the disclosed MHD system might have a designed power output of 1000 Megawatts, which could mean a flow rate of the combustion gases of upwards of 650 kg/sec. The effective cross section of the upper channel 34 could be 150–200 square meters and the velocity of the combustion gases through the upper channel 34 could be 15–20 meters/sec; while the effective overall cross section of the lower channel 36 could be 15–25 square meters and the velocity of the pressurized air through the lower channel 36 could be 20–25 m/sec. The velocity of the heat transfer liquid through the channel could be 0.05–0.15 m/sec. and the mass flow rate of the heat transfer liquid could be 1.0–1.5 kg/sec. for high contact cross or counterflow and 10–15 kg/sec. for the moderate contact parallel flow. The overall height of the heat exchanger could be 8–10 meters.

The combustion gases would be 2000°–2200° C. at the inlet 40 to the heat exchanger 30 and 1300°–1600° C. at the outlet 42; the pressurized air would be 1300°–1500° C. at the outlet 95; and the heat transfer liquid would range between these extremes with perhaps 1600°–1700° C. maximum and 1300°–1400° C. minimum. The percentages of the combustion gases recirculated throughout the seed separator 49 via the gas proporportioner 45 could range as high as 20–35%.

The embodiments of the invention in which an exclusive property or privilege is claimed are defined as follows:

1. In an MHD power generating system wherein fuel and oxidizer means are burned in a combustor and seed is added to enhance the electroconductivity of the combustion gases that in turn are passed through an MHD channel to generate a primary electrical output, the combination therewith of energy conversion means for the combustion gases discharged from the MHD channel that are yet at high energy levels, comprising heat exchanger means defining a closed loop having separate horizontally disposed upper and lower channels interconnected by respective separate vertically disposed columns and heat transfer liquid within the loop and completely filling each of the columns and each of the channels across the bottoms thereof to and between the liquid in the columns, said heat transfer liquid being in the liquid phase in the temperature range between approximately 1300° C. and 1800° C., the loop channels being at different elevations thereby providing a head pressure differential in the heat transfer liquid as between the upper and lower channels corresponding to the column head of the liquid between the liquid surfaces in the channels, spaced inlet and outlet means to each channel, means for continuously directing the combustion gases via the appropriate inlet means into the upper loop channel and for thermally admixing the combustion gases with the heat transfer liquid therein and for recovering the combustion gases therefrom via the outlet means, means for continuously directing air under pressure via the appropriate inlet means into the lower loop channel and for thermally admixing the air with the heat transfer liquid therein and for recovering the air therefrom via the outlet means, the pressures of the combustion gases and the air being generally comparable respectively to the pressures of the heat transfer liquid in the upper and lower loop channels, means for circulating the heat transfer liquid unidirectionally around the loop, whereby the combustion gases are continuously cooled by the heat transfer liquid which in turn continuously heats the air, and means for admitting the heated pressurized air recovered from the lower loop channel into the combustor to serve thereby as the oxidizer means.

2. The combination of claim 1, wherein said heat transfer liquid is copper oxide ($Cu_2O$).

3. The combination of claim 1, wherein slag can be condensed out from the ionized combustion gases by direct intermixing and contact with the heat transfer liquid, and wherein the upper channel has a weir type outlet disposed generally at the surface of the heat transfer liquid therein, whereby the condensed out slag can be carried away and separated by flotation from the heat transfer liquid.

4. The combination of claim 1, further comprising a seed separator located downstream of the heat exchanger in the flow path of the ionized combustion gases operable thereby to receive the combustion gases discharged from the upper channel outlet, said seed separator being in the form of a vessel having a coolant therein, wherein the combustion gases are passed directly through the coolant, means for maintaining said coolant at temperatures in the range of 1000°-1150° C. whereby any compound derivatives in the combustion gases of the seed will condense in the liquid coolant and will float to the surface of the liquid coolant, and weir means generally at the surface of the liquid coolant operable to separate said compound derivatives out by flotation for isolated discharge from the separator.

5. The combination of claim 4, wherein said liquid coolant for the seed separator is copper (Cu), potassium hydroxide (KOH), or other potassium salts.

6. The combination of claim 4, further wherein the means for maintaining the liquid coolant in said temperature range includes a gas proportioner disposed in the flow path for the combustion gases downstream of the heat exchanger and upstream of the seed separator, bottoming cycle means in the flow path of the combustion gases downstream of the seed separator within which the combustion gases are cooled, takeoff means in the flow path of the combustion gases downstream of the bottoming cycle means for diverting part of the cooled combustion gases to the gas proportioner for admixture with the combustion gases coming from the heat exchanger, and a control operable to divert suitable quantities of the cooled combustion gases via the takeoff means to the gas proportioner for providing a suitable temperature of the combined flow of combustion gases operable to keep the liquid coolant in the seed separator within said specific range of temperatures.

7. The combination of claim 4 wherein the means for maintaining the liquid coolant in said temperature range includes coolant passages in the seed separator and means to force a cooling fluid through the passages.

8. The combination of claim 1, wherein the combustion gases in passing through the upper channel of the heat exchanger are controllably cooled and are maintained generally at or above 1500° C. for a duration in excess of 1.5-2.0 seconds, whereby the nitrogen gas impurities $NO_x$ are thereby caused to decompose.

9. The combination of claim 1, wherein the heat exchanger loop includes containing material in the form of alumina ($Al_2O_3$), so that said material in part can dissolve in the heat transfer liquid and the heat transfer liquid can yet function to transfer heat between the combustion gases and the pressurized air.

10. The combination of claim 1, wherein the combustion gases at the heat exchanger outlet means are at temperatures of the order of 1300°-1600° C., and wherein the pressurized air at the heat exchanger outlet means are at temperatures of the order of 1300°-1500° C.

11. The combination of claim 1, wherein the heat transfer liquid is at temperatures of the order of 1300°-1700° C.

12. The combination of claim 1, wherein the heat transfer liquid circulating means includes means for injecting air into one vertical column to induce upward liquid movement within that one column.

13. The combination of claim 8, wherein the combustion gases are fuel-rich entering into the upper channel, wherein the heat transfer liquid circulating means includes means for injecting air into one vertical column to induce upward liquid movement within that one column, and wherein the injected air also converts the combustion gases to a stoichiometric ratio of 1.10-1.15 to support secondary combustion at temperatures less than about 1500° C.

* * * * *